United States Patent Office 3,485,923
Patented Dec. 23, 1969

3,485,923
FUNGICIDAL USE OF 2,6-DINITRO-p-TOLYL N-ALKYLCARBAMATES
Harold Marvin Foster, Park Forest, Ill., assignor to The Sherwin-Williams Company, Cleveland, Ohio, a corporation of Ohio
No Drawing. Filed July 13, 1967, Ser. No. 653,019
Int. Cl. A01n 9/20
U.S. Cl. 424—300        4 Claims

ABSTRACT OF THE DISCLOSURE 2,6-dinitro-4-tolyl N-alkylcarbamates are synthesized by reaction of 2,6-dinitro-p-cresol with alykl isocyanate. Products are useful for fungicides, especially in controlling mildew growth on surfaces containing *Pullularia pullulans*.

DESCRIPTION OF THE INVENTION

A novel method for synthesizing carbamates from alkyl isocyanates and dinitro-p-cresol has been found. The product is a compound having the following structural formula:

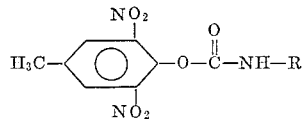

where R is an alkyl radical containing 1 to 3 carbon atoms. These carbamates have been found to have extremely good fungicidal properties, especially the compound 2,6-dinitro-4-tolyl N-methylcarbamate. The microorganism, *Pullularia pullulans*, is known to be important in the growth of mildew on organic matter, such as exterior surfaces painted with organic resin coatings, and this organism is effectively controlled by applying the carbamates of this invention in a suitable vehicle to those surfaces to be protected from *Pullularia pullulans*.

A typical synthesis process includes reacting the 2,6-dinitro-p-cresol with methyl isocyanate at ambient temperature in an inert diluent and a suitable catalyst. The preferred method includes the addition of the stoichiometric excess of isocyanate reactant to a slurry of the dinitrocresol in sufficient diluent to assure mixing of reactants during synthesis. Subsequently the reactant mixture is refluxed and purified by recrystallization from a solvent.

Example I

A slurry is formed with 39.6 grams (0.2 mol) of 2,6-dinitro-p-cresol in 200 milliliters of diethyl ether. A catalyst system including 4 drops of di-n-butyltin diacetate and 0.1 g. of triethylenediamine is added to the slurry. The slurry is maintained at room temperature (20–25° C.) and vigorously stirred while 25.1 g. (0.44 mol) of methyl isocyanate is added, incrementally or batch wise. The stirring is continued for about 15 hours at ambient temperature, after which the mixture is refluxed gently for 1 hour and cooled. After filtering, 36.6 g. of solids are recovered having melting point of 130–131.5° C. The sample is purified by recrystallization using 600 ml. of a solvent containing 200 parts by volume of dichloromethane and 400 parts cyclohexane. The product yield is 20 g. of pure 2,6-dinitro-4-tolyl N-methylcarbamate having a melting point of 140.5–142.5° C. Analysis of the product by weight percent compares closely to the calculated values for each element:

Percent calculated ($C_9H_9N_3O_6$): C, 42.36; H, 3.55; N, 16.47. Percent determined: C, 42.68; H, 3.84; N, 16.46.

The structure of 2,6-dinitro-4-tolyl N-methylcarbamate was confirmed by infrared and nuclear magnetic resonance spectra.

The above synthesis process was found to give high purity and yield. The reaction time, temperature, ratio of reactants and amount of catalyst or diluent can be varied widely. For optimum results, both catalytic components should be used, and sufficient diluent is added to give a complete reaction. When these conditions are not met, poor yield of inferior quality product will result.

Example II

The procedure of Example I is followed using 9.9 g. (0.05 mol) of 2,6-dinitro-p-cresol, 60 ml. of ether diluent, 0.05 g. of triethylenediamine, 2 drops of dibutyltin diacetate, and 5.3 g. (0.0625 mol) of isopropyl isocyanate. After stirring for 20 hours at ambient temperature and refluxing for three hours, the mixture is diluted with 100 ml. of ether, reheated, clarified, and concentrated to the original volume. The cooled mixture is filtered and the solids digested in boiling hexane. The filtered and dried product weights 6.2 g. and has a melting point of 109–110° C. 2,6-dinitro-4-tolyl N-isopropylcarbamate is recrystallized from a dichloromethane/hexane mixture and dried. A melting point of 117–117.5° C. is found. The structure of the compound is supported by infrared and nuclear magnetic resonance spectra. Analysis of the compound compares favorably with theoretical values:

Percent calculated ($C_{11}H_{13}N_3O_6$): C, 46.64; H, 4.62; N, 14.84. Percent determined: C, 47.00; H, 4.52; N, 15.00.

The preparation of a fungicidal composition using 2,6-dinitro-4-tolyl N-alkylcarbamates as the bioligically active component can include admixing, dissolving, or dispersing the carbamate in a carrier vehicle. For most purposes an organic liquid vehicle, such as ethanol, acetone, chloroform, halogenated hydrocarbons, aromatic hydrocarbons, etc., with a small amount of the active component, e.g., 100 p.p.m. to 1%, produces a satisfactory fungicide. Also, a solid particle vehicle may be useful for dust-type fungicides having non-caking properties.

The fungicidal properties of 2,6-dinitro-4-tolyl N-methylcarbamate and 2,6-dinitro-4-tolyl N-isopropylcarbamate were compared to similar compounds and other known fungicides. The biological evaluations were performed according to U.S.D.A. Circular No. 198, 1931, upon a Difco potato dextrose agar plate. The samples were dissolved in acetone or ethanol in two concentration levels and applied uniformly to sterile filter paper pads (0.5 inch diameter). After evaporation of the carrier liquid, the pads were placed on the agar plates. Both pads and agar plates were innoculated with a spore suspension of the test fungus, *Pullularia pullulans*. After a period of standard incubation, the pads and agar plates were examined to determine fungus growth on the pad and to measure the zone of fungus growth inhibition in the agar plate beyond the periphery of the treated pad.

Table I shows the results of comparative tests for the fungicidal use of two species of the dinitrotolyl N-alkylcarbamates of this invention.

TABLE I

| Sample | Concentration of solution applied to sterile filter paper pads (p.p.m.) | Pullularia pullulans Width of zone (mm.) | Growth on pad |
|---|---|---|---|
| 2,6-dinitro-4-tolyl N-methyl-carbamate. | 1,000 | 25+ | No. |
|  | 100 | 11 | No. |
| 2,6-dinitro-4-tolyl N-isopropyl-carbamate. | 1,000 | 0 | No. |
|  | 100 | 0 | Yes. |
| Captan, (N-trichloromethyl-thiotetrahydrophthalimide). | 1,000 | 10 | No. |
|  | 100 | 3 | No. |
| Control | 0 | 0 | Yes. |
| 4-tolyl N-methylcarbamate | 1,000 | 0 | Yes. |
|  | 100 | 0 | Yes. |
| 2-nitro-4-tolyl N-methylcarbamate. | 1,000 | 0 | Yes. |
|  | 100 | 0 | Yes. |
| 2-nitro-4-tolyl N-isopropylcarbamate. | 1,000 | 0 | Yes. |
|  | 100 | 0 | Yes. |

Activities of the 2,6-dinitro-4-tolyl N-alkycarbamates used in the evaluation test shown in Table I were studied to compare the activities of the methylcarbamate and isopropylcarbamate in contact with three microorganisms. In Table II, the fungicide concentration, inhibition zone, and pad growth are the same measurements reported in Table I.

TABLE II

| R | Concentration (p.p.m.) | Microorganism 1 Zone | Microorganism 1 Pad Growth | Microorganism 2 Zone | Microorganism 2 Pad | Microorganism 3 Zone | Microorganism 3 Pad |
|---|---|---|---|---|---|---|---|
| Methyl | 10,000 | 25+ | No | 10 | No | 6 | No. |
| Do | 1,000 | 25+ | No | 0 | Yes | 0 | Yes. |
| Do | 100 | 11 | No | 0 | Yes | 0 | Yes. |
| Isopropyl | 10,000 | 5 | No | 19 | No | 11 | No. |
| Do | 1,000 | 0 | No | 0 | No | 0 | Yes. |
| Do | 100 | 0 | Yes | 0 | No | 0 | Yes. |
| Control | 0 | 0 | Yes | 0 | Yes | 0 | Yes. |

Table I. Microorganism 1 is *Pullularia pullulans*, 2 is *Cladosporium sphaerospermum*, and 3 is *Aspergillus niger*.

As demonstrated by the biological activity data in the tables, fungicidal activity cannot be predicted from one microorganism to another for any one compound. Neither can the activity upon a single micro-organism be predicted for an untested compound that is closely related structurally to another compound of known fungicidal activity. The methylcarbamate species of the invention possesses unusual activity toward *Pullulara pullulans*, and is shown to be especially valuable for controlling mildew growth on surfaces of organic matter when applied to the surface in a fungicidally effective amount.

What is claimed is:
1. A method for controlling mildew growth on a surface containing *Pullularia pullulans* which comprises: applying to the surface an organic liquid carrier containing a carbamate compound in sufficient concentration to inhibit growth of *Pullularia pullulans*, said carbamate compound having the following structural formula:

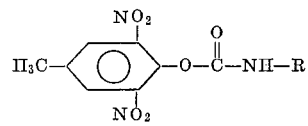

where R is an alkyl of 1 to 3 carbon atoms.
2. The method of claim 1 wherein R is methyl.
3. The method of claim 1 wherein R is isopropyl.
4. A process for killing fungi comprising applying to the fungi a fungicidally effective amount of 2,6-dinitro-4-tolyl N-methylcarbamate or 2,6-dinitro-4-tolyl N-isopropylcarbamate.

References Cited

UNITED STATES PATENTS

| 2,933,383 | 4/1960 | Lambrech | 71—2.6 |
| 3,057,910 | 10/1962 | Fischer et al. | 260—479 |
| 3,308,018 | 3/1967 | Gier et al. | 167—30 |

OTHER REFERENCES

Kolbezen et al., Agricultural and Food Chemistry, vol. 2, pp. 864–870 (1954).

ALBERT T. MEYERS, Primary Examiner
JAMES V. COSTIGAN, Assistant Examiner